Sept. 21, 1926.  
J. ZABEL  
1,600,571

FUR TRIMMING MACHINE

Filed May 29, 1925      2 Sheets-Sheet 1

Jacob Zabel  
INVENTOR.

Sept. 21, 1926.　　　　　　　　　　　　　　1,600,571
J. ZABEL
FUR TRIMMING MACHINE
Filed May 29, 1925　　　　2 Sheets-Sheet 2
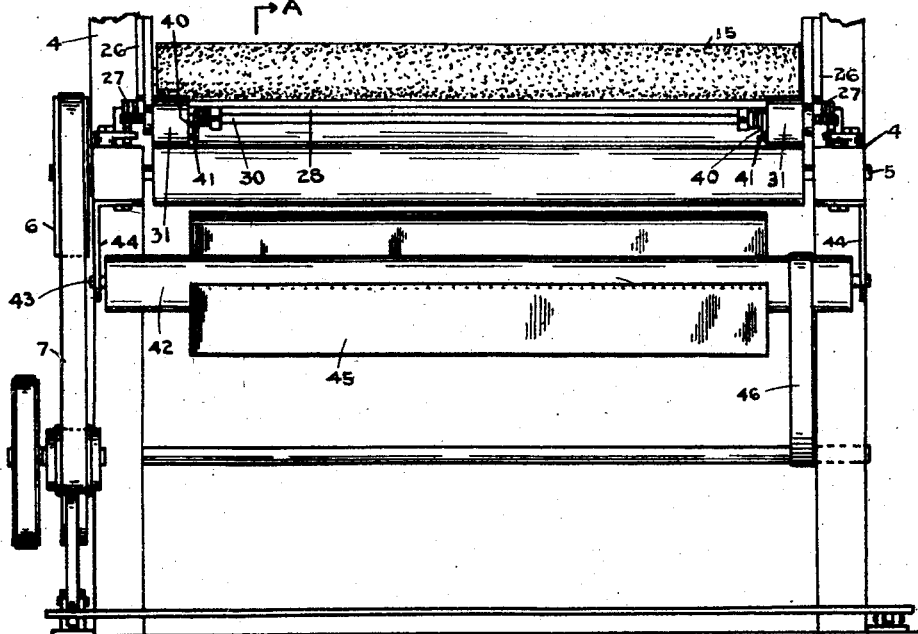
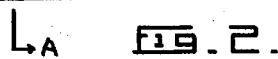
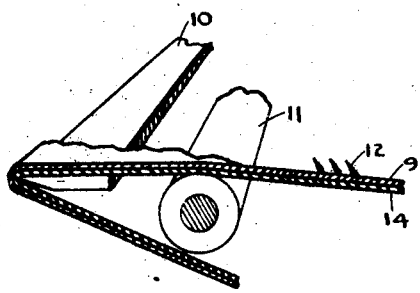
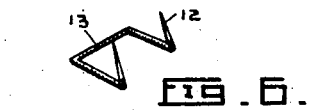
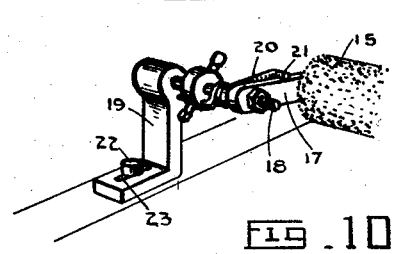
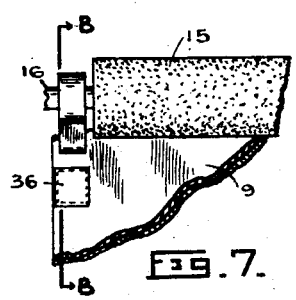
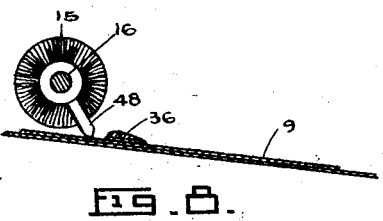
Jacob Zabel
INVENTOR.

Patented Sept. 21, 1926.

1,600,571

UNITED STATES PATENT OFFICE.

JACOB ZABEL, OF TORONTO, ONTARIO, CANADA, ASSIGNOR OF ONE-THIRD TO FRANK HALLMAN AND ONE-THIRD TO ZODOK SABLE, BOTH OF TORONTO, CANADA.

FUR-TRIMMING MACHINE.

Application filed May 29, 1925. Serial No. 33,768.

The invention relates to improvements in fur trimming machines as described in the present specification and shown in the accompanying drawings that form a part of the same.

One object of the invention is to provide means for insuring the delivery of the skins to the trimming knives in true alignment without the necessity of having to sew the skins together prior to introduction into the machine as has been the practice heretofore.

Another object is the provision of means for combing the fur during the progress of the skins to the trimming knives and thus insure even trimming of the hairs.

A further object is to reduce to a minimum the time and cost of trimming furs.

And generally the objects of the invention are to provide an efficient fur trimming machine which will be inexpensive to construct and which may be easily operated by persons not necessarily skilled in mechanics.

The invention consists broadly in the inclusion in a trimming machine having suitable trimming knives and means for operating same and means for drawing the hairs outwardly from the skins in passage past the knives, of a movable carrier provided with hooks secured in proper alignment with said knives and on which the skins are adapted to be mounted, a vertically adjustable brush in roller form under which the skins are adapted to pass in progress towards the knives, a vertically adjustable element positioned between said brush and said knives and adapted to prepare the fur for trimming and also serving as a means to prevent the skins from being drawn into the knives by the suction, and means positioned beneath the carrier adapted to release the skins from the hooks subsequent to the trimming operation, suitable means being included for effecting the vertical adjustment of said brush and the combing and holding element during certain stages of the operation.

In the drawings Figure 1 is a plan view of the machine.

Figure 2 is a front view.

Figure 5 is an enlarged longitudinal sectional view in perspective through the inner end of the carrier and its support, and also showing the method of securing the hooks.

Figure 6 is a perspective view of one of the double hooks by means of which the skins are secured to the carrier.

Figure 7 is a fragmentary view showing a modified method of automatically effecting the vertical adjustment of the brush.

Figure 8 is a cross sectional view taken on the line B—B of Figure 7.

Figure 10 is a perspective detail showing the method of resiliently supporting the rotary brush.

Like numerals of reference indicate corresponding parts in the various figures.

Figure 1:
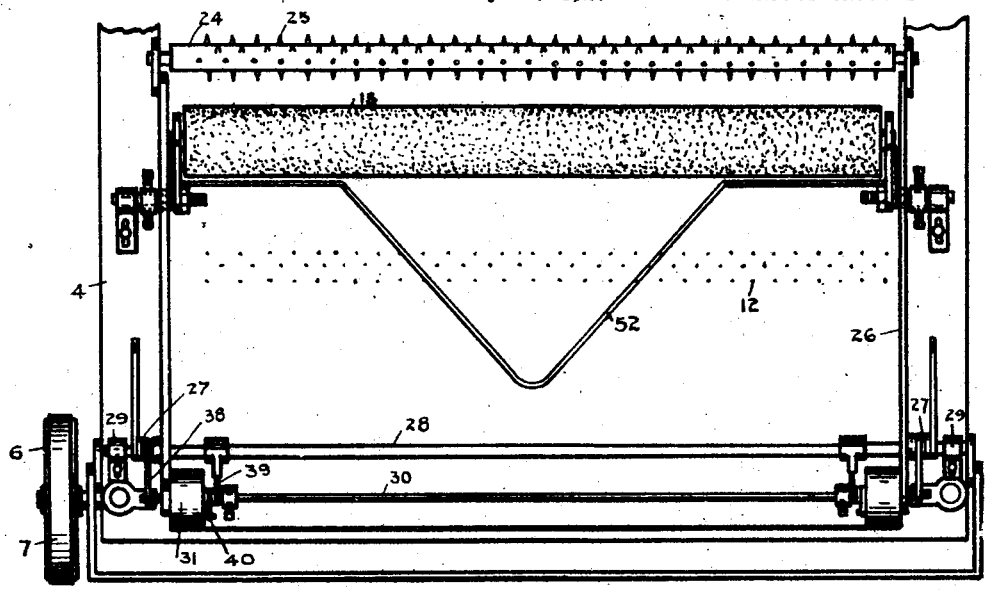

Referring to the drawings A represents a trimming machine of any known type, which is provided with rotary cutters 1 operating in conjunction with a vertical blade 2 to trim the fur on the skins, a suitable guard element 3 being provided, suitable means also being provided for creating suction to draw the hairs outward from the skins towards the knives in progress past said knives.

The frame A is provided with parallel forwardly extending arms 4 provided at their outer ends with bearings in which is mounted a shaft 5 carrying a pulley 6 over which operates a belt 7, having suitable operating connection with the means for rotating the knives (said connection being shown in dotted lines in Figure 3) said shaft 5 having a roller 8 rigidly mounted thereon and constituting a means for driving the endless carrier 9.

10 is a bar extending across the machine in parallel relation to the blade 2 and being secured at its ends to the respective arms 4 and constituting a support around which the carrier 9 operates, said bar being spaced from the blade 2 a sufficient distance to permit of the skins passing said blade without being injured thereby, but being sufficiently close that when the hairs are drawn outwardly from the skin by the suction they will project over said blade and into the path of the rotary knives 1 for trimming.

The bar 10 is preferably tapered towards the blade 2 so as to provide a sharp break in the course of the carrier at the point nearest to said blade so as to permit of the hairs projecting as far and as cleanly as possible from the skin during the trimming operation.

11 is a roller positioner in advance of the bar 10 and extending parallel therewith, said roller being mounted at its ends in the arms 4 and constituting an intermediate support for the top of the carrier 9.

The carrier 9 is preferably constructed of two layers of canvas, or other flexible material, in superposed relation to one another, said layers being stitched together at intervals, or left free as desired.

12 are hooks adapted to project from the face of the carrier 9 in transverse series and on which the skins are adapted to be hung during the trimming operation, said hooks preferably being formed by bending a piece of material in substantially U shape and turning outwardly and pointing the ends thereof, the body portion 13 being positioned between the layers 9 and 14 of the carrier and preferably being stitched to the layer 9 while the upturned hook portions project through said layer 9.

As the hooks 12 are secured in true alignment with the trimming elements it is simply necessary to place the skins straight on the carrier and they will retain their proper position in relation to said trimming elements throughout the trimming operation without the necessity of sewing the skins to one another prior to their introduction into the machine.

It is advisable that the skins be pressed out before delivery to the cutters and for this purpose a rotary brush, or roller, 15 positioned directly over the roller 11 is provided, said brush being mounted for rotation on a shaft 16 having right angle arms 17 rotatably mounted on inwardly extending shafts 18 carried by brackets 19 which in turn are mounted on the arms 4, said brush being resiliently held to its down position by means of springs 20 encircling the shafts 18 and having fingers 21 exerting downward pressure on the arms 17 respectively.

It is preferable that the brackets 19 be adjustable longitudinally of the arms 4 and for this purpose they are secured thereto by means of bolts, or other fasteners, 22 extending through slots 23 in said brackets.

In order to prevent the skins being drawn into the knives by the suction and at the same time permit of the hairs being drawn outwardly over the blade 2 a rotary weight member, or roller, 24 having pin like projections, or teeth, 25 therefrom adapted to bear down on the skin, is provided, said roller being resiliently supported for vertical adjustment by means of forwardly extending arms 26 rotatably supported adjacent to their outer ends on a shaft 28 journalled at its ends in brackets 29 adjustably mounted on the arms 4, said arms carrying at their outer ends a transverse shaft 30 projecting at each end past the respective arms 26.

31 are rollers rotatably mounted on the shaft 30 adjacent to the arms 26 respectively, and adapted to rest on the carrier 9 and to be rotated thereby, said rollers respectively being cut away as at 33 to provide flat portions adapted to rest on the carrier throughout the greater portion of the travel thereof and thus lowering the outer ends of the arms 26 and holding the member 24 to its raised position, said rollers also being provided with notches 34 providing shoulders 35 adapted to be engaged by projections 36 from the top side of said carrier for tripping said rollers to cause the rotation of same and thus lowering the member 24 into engagement with the skin in its progress past the knives, said rollers 31 being of the required diameter that the time required to complete the revolution of the circular portions thereof will equal the time required to carry the skin past the cutters, subsequent to which said rollers do not rotate until the trip members 36 reengage the shoulders 35.

37 are springs encircling the shaft 28 adjacent to the ends thereof and having their ends 38 exerting pressure on the outer ends of the shaft 30 to hold the rollers 31 in engagement with the carrier 9.

39 are springs encircling the shaft 30 adjacent to the inner faces of the rollers 31 respectively and having their ends 40 projecting outwardly and exerting downward pressure on pins 41 projecting outwardly from the inner faces of said rollers 31 respectively, said springs being for the purpose of facilitating the tripping of said rollers.

42 is a roller rotatably mounted transversely of the machine on a shaft 43 mounted in brackets 44 carried by the frame of the machine, said roller being positioned beneath the carrier 9 preferably adjacent to the forward end of the machine and being provided with laterally projecting blades 45 adapted on the rotation of the roller to strike the skin which hangs downwardly from the hooks 12 and dislodge same, permitting it to fall to the floor, or into suitable receptacles, as desired, said roller being driven by means of a belt 46 operating therearound and over a pulley 47 having suitable connection with the drive mechanism.

Figures 3, 4, 9:
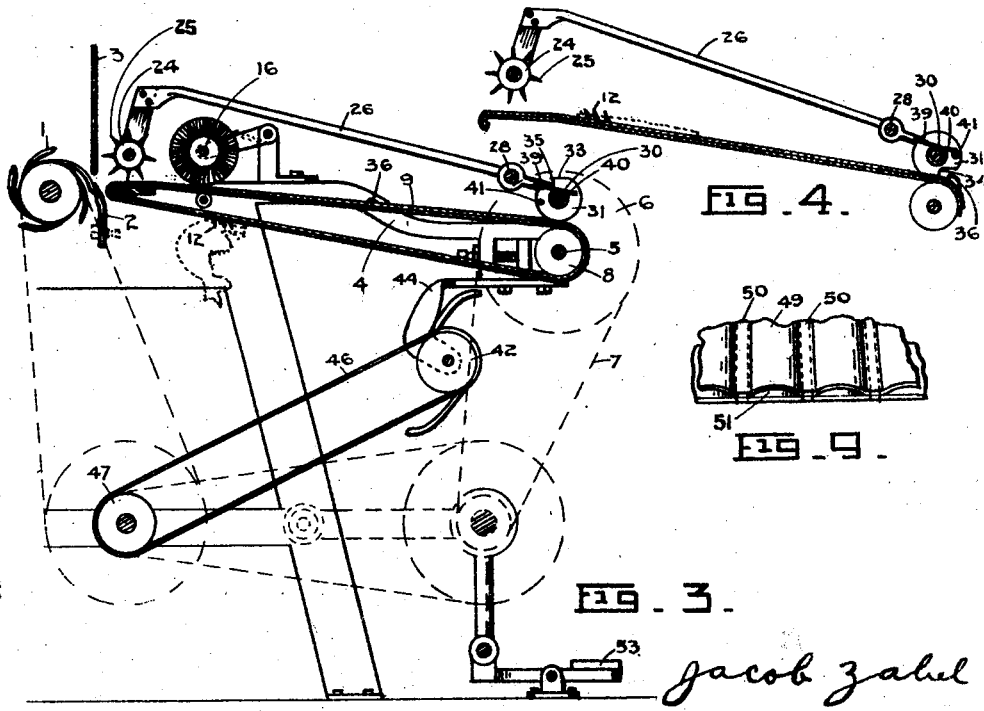
Figure 3 is a vertical sectional view taken substantially on the line A—A of Figure 2.
Figure 4 is a cross sectional view through the top portion of the movable carrier showing the skin holding and combing element in its inoperative position.
Figure 9 is a perspective view of a portion of the carrier showing a modified method of raising the brush, or roller.

In Figures 8 and 9 a method of automatically raising the brush 15 is shown in which said roller is provided at its ends with forwardly and downwardly projecting fingers 48 adapted to project into the paths of the bosses 36 on the carrier so as to raise the roller during the passage of the hooks 12 thereunder.

In Figure 9 a modified form of trip boss is shown, consisting of a piece of elastic material 49 stitched transversely of the carrier at intervals as at 50 to provide spaced parallel pockets 51 into any one of which may be inserted a piece of wood, metal, or any other material capable of raising the rollers 15 and 31, thus making it possible to time the raising of said rollers as desired.

If desirable a spreader 52, consisting of a substantially V-shaped bar mounted above the carrier 9, may be employed to hold the skins securely to the carrier until they reach the brush 15.

In the operation of this invention the movement of the carrier 9 is arrested by means of the foot pedal 53, (the particular construction and method of operation of which is not shown in the drawings clearly as it does not constitute a part of the present invention) and the skin to be trimmed is placed on the hooks 12 in proper alignment with the trimming knives. The pressure on the pedal 53 is then released causing the carrier to resume its forward movement carrying the skin towards the cutters during the progress of which it passes under the brush 15 which irons out the skin, after which it passes beneath the member 24 which has meanwhile been lowered by means of the projections 36 from the carrier striking the shoulders 35 of the rollers 31 and rotating same to raise the outer ends of the arms 26, and around the sharp break in the carrier caused by the tapered bar 10, the weight member 24 holding the skin to the carrier against the suction which draws the fur outwardly across the vertical blade 2 and into the paths of the rotary cutters 1 which trim the fur, the teeth 25 from the member 24 combing out the fur prior to its delivery to the cutters. After the skin passes the cutters it depends downwardly and into the path of the blades 45 which are constantly rotating and which strike said skin and release it from the hooks. While the skin is passing beneath the member 24 the rollers 31 are rotating and as soon as the flat portions 33 of said rollers again engage the carrier they drop down slightly causing the member 24 to be raised slightly, in which position it remains until the projections 36 again release the rollers for the next operation.

What I claim is:—

1. In a fur trimming machine, in combination, trimming knives, means for operating said knives, an endless carrier operating in advance of said knives and adapted to deliver skins to same for trimming, means carried by said carrier for holding said skins in alignment with said knives during the cutting operation, and means for combing the fur on said skins prior to delivery to said knives.

2. In a fur trimming machine, in combination, trimming knives, means for operating said knives, an endless carrier operating in advance of said knives and adapted to deliver skins to same for trimming, means carried by said carrier for holding said skins in alignment with said knives during the trimming operation, means for pressing out said skins, and means for holding the unhooked portions of said skins in engagement with said carrier prior to trimming, said means being adapted to permit of the fur extending outwardly into the path of said knives.

3. In a fur trimming machine, in combination, trimming knives, means for operating said knives, an endless carrier operating in advance of said knives and adapted to deliver skins to said knives for trimming, hooks secured in said carrier in predetermined relation to said knives and constituting supports for said skins, means for ironing out said skins, means for combing out the fur on said skins prior to delivery to said knives, and means for releasing said skins from said carrier subsequent to the trimming operation.

4. In a fur trimming machine, in combination, cutting elements, means for operating said cutting elements, an endless carrier operating in advance of said cutting elements and adapted to deliver skins to same, hooks carried by said carrier in predetermined relation to said cutting elements and constituting supports for said skins, means for preparing said skins for trimming, said means including a vertically adjustable combing element, means for effecting the vertical adjustment of said combing element during certain stages of the operation of the machine, and means for releasing the skins from the carrier subsequent to the trimming operation.

5. In a fur trimming machine, an endless moving carrier, skin supporting hooks projecting outwardly from said carrier, cutting elements, means for operating said cutting elements and said carrier, means for holding said skins to said carrier against said suction, said means including a weight member carrying teeth adapted to bear against said skins and to permit of said fur being drawn therebetween, and means for releasing said skins from said hooks subsequent to the trimming operation.

6. In a fur trimming machine, in combination, an endless movable carrier, hooks carried by said carrier and adapted to support the skins in true position for trimming, a cutting element, means for operating said cutting element and said carrier, a vertically yieldable weight member adapted to hold the skins in engagement with said carrier prior to trimming, said member being provided with means adapted to permit the hairs being drawn outwardly therefrom, a vertically yieldable brush member positioned in advance of said weight member, means carried by said carrier for effecting the vertical adjustment of said weight member and said brush member at predetermined intervals, and means for releasing said skins from said carrier subsequent to the trimming operation.

7. In a fur trimming machine, in combination, a cutter, means for operating same, an endless carrier operating in advance of said cutter and adapted to deliver skins to same for trimming, hooks carried by said carrier in predetermined relation to said cutter and constituting supports for said skins, means for preparing said skins for cutting during the progress towards said cutter, said means including a vertically adjustable combing element, and means for releasing the skins from said carrier subsequent to the trimming operation.

8. In a fur trimming machine, in combination, a cutting element, means for operating said cutting element, an endless carrier operating in advance of said cutting element and adapted to carry skins past said cutting element, hooks mounted in said carrier and constituting aligned supports for said skins, and means for releasing said skins from said hooks subsequent to the trimming operation, said means including a member rotatably mounted below said carrier and having projections adapted to dislodge said skins from said hooks.

9. In a fur trimming machine, in combination, cutting elements, means for operating said cutting elements, an endless carrier operating in advance of said cutting elements and adapted to carry the skins past said cutting elements, said carrier comprising superposed layers of material, means for removably supporting said skins on said carrier and holding same in alignment with said cutting elements, said means including a plurality of substantially U-shaped members secured between the layers of material comprising the carrier and having their ends turned at right angles and projected through the uppermost layer and pointed to provide hooks, means for holding the unhooked portions of said skins in engagement with said carrier prior to trimming, said means being adapted to permit of the fur on said skins being drawn by suction into the path of said cutting elements, and a rotatable releasing member.

10. In a fur trimming machine, in combination, cutting elements, means for operating said cutting elements, an endless carrier adapted to deliver skins to said cutting elements for trimming, means to prevent said skins from being drawn into the path of said cutting elements, the last mentioned means including a transversely arranged member adapted to bear down on the skin during its progress to said cutting elements, said member being rotatably mounted at its ends in forwardly extending arms pivoted intermediately of their length for vertical movement and carrying at their outer ends eccentrics engaging the outer face of said carrier at the front thereof and rotatable through the movement of said carrier, spring members operatively connected to said arms and engaging said eccentrics respectively and exerting pressure thereon to hold said rotatable member to its down position, and obstructions secured to said carrier in the paths of said eccentrics, to effect the vertical adjustment of said rotatable member.

11. In a fur trimming machine, in combination, cutting elements, an endless carrier adapted to deliver skins to said cutting elements for trimming, hooks carried by said carrier and constituting aligned supports for said skins, a rotary brush transversely mounted in advance of said holding means and spring held to its operative position in engagement with said skins, and means for releasing said skins from said carrier subsequent to the trimming operation.

12. In a fur trimming machine, in combination, cutting elements, an endless carrier adapted to deliver skins to said cutting elements for trimming, hooks carried by said carrier in transverse series and constituting aligned supports for said skins, vertically yieldable means for holding said skins against said suction, a rotary member transversely mounted in advance of said holding means and spring held to its down position, lateral projections from said carrier, fingers from said rotary member extending into the paths of said projections and on engagement therewith raising said rotary member after each operation, and means positioned below said carrier for releasing said skins subsequent to trimming.

13. In a fur trimming machine, in combination, cutting elements, an endless carrier adapted to deliver skins to said cutting elements for trimming, supports for said carrier, said supports including a driven roller positioned at the forward end of the machine and a stationary member positioned adjacent to said cutting elements, said stationary member being tapered towards said cutting elements, hooks secured to the inner face of said carrier and projecting therethrough and constituting supports for said skins, a combing element, means for raising said combing element subsequent to each trimming operation and lowering same for the next operation, and a releasing element positioned beneath said carrier.

14. In a fur trimming machine, in combination, a vertical cutting blade, rotary cutters positioned adjacent to said vertical blade, an endless carrier adapted to deliver skins to said cutters, a combing element positioned in advance of said cutters, said combing element including a vertically adjustable roller rotatably supported above said carrier and carrying teeth projecting into the path of the skin in progress to said cutters, and a rotatable member positioned beneath said carrier and adapted to release the skins from said hooks.

15. In a fur trimming machine, in combination, cutting elements, an endless movable carrier adapted to deliver skins to said cutters, means carried by said carrier for holding said skins in alignment with said cutters during the trimming operation, means for combing out the fur on said skins prior to trimming, said means including a vertically adjustable roller rotatably supported above said carrier and having teeth projecting into the path of said skins in progress to said cutters, arms rotatably supporting said roller, said arms being pivoted for vertical rotation adjacent to the forward end of the machine, a shaft connecting the outer ends of said arms, rollers rotatably mounted on said shaft adjacent to said arms respectively, and spring held to engage said carrier, said rollers being cut away transversely and constituting eccentrics adapted on rotation to effect the vertical adjustment of said combing element, and projections carried by said carrier for tripping said rollers at predetermined stages in the operation of the carrier.

16. In a fur trimming machine, in combination, cutting elements, an endless carrier adapted to deliver skins to said cutting elements for trimming, hooks carried by said carrier and constituting supports for skins, means for preventing said skins from being drawn into said cutting elements, a rotary brush transversely mounted in relation to said carrier and adapted to iron out said skins, a roller rotatably mounted below said carrier and carrying blades adapted on the rotation of said roller to disengage said skins from said hooks, and means for driving said carrier, said cutting elements and said releasing device.

Signed at the city of Toronto, Ont., this 16th day of March, 1925.

JACOB ZABEL.